US007596524B1

(12) United States Patent
Singh

(10) Patent No.: US 7,596,524 B1
(45) Date of Patent: Sep. 29, 2009

(54) SYSTEMS AND METHODS FOR MEASURING INTEREST RATE EXPOSURE FOR A PORTFOLIO OF FIXED-INCOME INSTRUMENTS

(75) Inventor: Jaidip Singh, Berwyn, PA (US)

(73) Assignee: Morgan Stanley, New York, NY (US)

( * ) Notice: Subject to any disclaimer, the term of this patent is extended or adjusted under 35 U.S.C. 154(b) by 495 days.

(21) Appl. No.: 11/151,633

(22) Filed: Jun. 13, 2005

(51) Int. Cl.
G06Q 40/00 (2006.01)
(52) U.S. Cl. .................................. 705/36 R
(58) Field of Classification Search ............... 705/36 R
See application file for complete search history.

(56) References Cited

U.S. PATENT DOCUMENTS

2005/0228734 A1* 10/2005 Pagani ........................ 705/36

OTHER PUBLICATIONS

Falkenstein, Eric; Hanweck, Jerry, "Minimizing Basis Risk from Non-Parallel Shiftws in the Yield Curve," Journal of Fixed Income, Jun. 1996, vol. 6, No. 1, p. 60.*
Falkenstein, Eric; Hanweck, Jerry, Jr.; "Minimizing Basis Risk from Non-Parallel Shiftws in the Yield Curve, Part II: Principal Components," Journal of Fixed Income, Jun. 1997, vol. 7, No. 1, p. 85.*
Kambhu et al., "The Effect of Interest Rate Options Hedging on Term- Structure Dynamics," FRBNY Economic Policy Review, Dec. 2001.
Faulkender, "Hedging or Market Timing? Selecting the Interest Rate Exposure of Corporate Debt," Journal of Finance, vol. LX, No. 2, Apr. 2005.
Errais, "An approximation of one factor interest rate models by Markov Chains," Management Science and Engineering, Terman Engineering Center, $3^{rd}$ Floor, Stanford Univ., Nov. 2002.
Zhu, "Three-Factor Interest Rate Models," Comm. Math. Sci., vol. 1, No. 3, pp. 557-573.
Robert Selvaggio, "Yield curve buffer," Balance Sheet, vol. 4, No. 3, pp. 21-24, Autumn 1995.

(Continued)

*Primary Examiner*—Charles R Kyle
*Assistant Examiner*—David L Wood
(74) *Attorney, Agent, or Firm*—K&L Gates LLP

(57) ABSTRACT

A computer-assisted method for analyzing the interest rate exposure of a fixed-income instrument, such as a bond, is disclosed. The method includes the step of identifying N significant constituent exposures (e.g., exposures identified from principal component analysis or factor analysis) in a yield curve. The method may also includes the step of computing a unique set of hedge weights for M hedge instruments, wherein M>N, that nullifies the N significant constituent exposures of the fixed-income instrument and that minimizes up to M key-rate exposures of the fixed-income instrument. The hedge weights for each instrument in a portfolio of fixed-income instruments can be aggregated. In addition, the hedge weights for each instrument in a portfolio index applicable to the portfolio may be aggregated, and the aggregated portfolio hedge weights can be compared to the aggregated index hedge weights to obtain a measure of the interest rate exposure of the portfolio relative to the index.

31 Claims, 5 Drawing Sheets

OTHER PUBLICATIONS

Leschhorn, "Managing yield-curve risk with ciombination hedges," Financial Analysts Journal, vol. 57, No. 3, pp. 63-75, May/Jun. 2001.

Mark Fisher, "Forces that shape the yhield curve," Econmic Review—Federal Reserve Bank Atlanta, vol. 86, No. 1, pp. 1-14, First Quarter 2001.

Lekkos, I., "A critique of factor analysis of interest rates," Journal of Derivatives, Fall 2000.

Golub, B. et al., "Measuring yield curve risk using principal components analysis, value at risk, and key rate durations," Journal of Portfolio Management, vol. 23, No. 4, p. 72, Summer 1997.

Barber, J. et al., "Immunization using principal component analysis: an immunization strategy based upon historical term structure shifts," Journal of Portfolio Management, vol. 23, No. 1, Fall 1996.

* cited by examiner

SYSTEMS AND METHODS FOR MEASURING INTEREST RATE EXPOSURE FOR A PORTFOLIO OF FIXED-INCOME INSTRUMENTS

BACKGROUND

The present invention relates generally to techniques for measuring the interest rate exposure for fixed-income instruments, such as bonds.

A yield curve is a curve that shows the relationship between yields (i.e., interest rates) and maturity dates for a set of similar fixed-income instruments, such as bonds, at a given point in time. Yield curve exposure management is an important consideration that confronts many fixed-income portfolio managers. Portfolio managers typically use known analytical tools to precisely measure yield curve movements in order to effectively hedge their portfolio against systematic yield curve exposures (as opposed to idiosyncratic or non-systematic yield curve exposures).

Known statistical methods used by fixed-income portfolio managers to identify systematic changes in yield shape curve include principal component analysis (PCA) and factor analysis. Using these techniques, if N systematic changes in the yield curve are identified by either the PCA or factor analysis (referred to as "principal components" or "factors"), N hedge instruments can be used to hedge any bond (or other type of fixed-income financial instrument) against a combination of systematic curve moves.

Consider the example shown in FIG. 1. In this example, three principal components or factors (PC1, PC2 and PC3) have been identified. Each of the principal components (or factors) represent systematic reshapings of the yield curve. Two curves—symmetric about the 0 basis point change axis—for each principal component are shown in FIG. 1.

When three such principal components (or factors) are identified, three hedge instruments (such as futures), denoted as f1, f2 and f3, can be used to hedge one unit par-amount of a bond Y. In the following description, the dollar price change of $f_i$ relative to its base price, given an occurrence of $PC_j$, is denoted as $f_{ij}$. This dollar price change may be referred to as the j-th factor exposure for hedging instrument (e.g., future) i. The dollar price change of Y, relative to its base price, given the occurrence of $PC_j$ is denoted as $Y_j$. Thus, $Y_j$ may be considered the j-th factor exposure of bond Y.

The hedge weights (denoted as w1, w2, and w3) for each of the hedge instruments (f1, f2 and f3) to hedge the bond Y may be determined by solving the following set of equations:

$w1f_{11}+w2f_{21}+w3f_{31}=Y_1$   Eq. 1 (hedge against occurrence of PC1)

$w1f_{12}+w2f_{22}+w3f_{32}=Y_2$   Eq. 2 (hedge against occurrence of PC2)

$w1f_{13}+w2f_{23}+w3f_{33}=Y_3$   Eq. 3 (hedge against occurrence of PC3)

It should be noted that this approach assumes that any three hedge instruments can be used to hedge the systematic risk described by combinations of the three principal components.

A portfolio manager may compute the hedge weights for all bonds in the portfolio and the portfolio index. Typically, a maximum of three stable factors or principal components are estimated. A straightforward hedging approach would then be to use a set of three hedge instruments to hedge the yield curve exposure of all bonds in the portfolio and index. Picking the number of hedge instruments to match the number of principal components or factors is the simplest way of ensuring the existence of a unique solution.

While this hedging framework provides the benefit of parsimony, the drawback of this approach is that while the three principal components or factors are adequate for hedging systematic risk over the estimate interval, there is also some idiosyncratic risk in the yield curve. Further, the estimation of principal components or factors is dependent on the estimation interval; the factors change shape as the estimation interval is changed. This may be thought of as measurement error with regard to the factors.

Therefore, it is not generally the case that any combination of three hedge instruments will serve as equally good hedges for a given bond. Consider the case where the portfolio manager specifically wishes to underweight the exposure to the five-year sector of the yield curve, relative to the portfolio's index, by selling 5-year Treasury futures. In a simple three-hedging instrument framework, as discussed above, each bond in the portfolio and in the index is hedged by a combination of three hedge instruments. The portfolio and index interest rate exposure are expressed in terms of market weightings (e.g., w1, w2 and w3) in the three hedge instruments. The relative yield curve exposure is computed as the difference of the portfolio and index weightings.

Assume in this example that the 2-, 10- and 30-year futures are the hedge instruments. In this framework, therefore, the 5-year futures contract is indistinguishable from a combination of 2-, 10- and 30-year futures. For example, a $1 face amount in a 5-year future might be equivalent to a $0.68 face amount of the 2-year future plus a $0.66 face amount of the 10-year future minus a $0.12 face amount of the 30-year future in the hedging framework. In other words, given the estimation interval, the principal component approach assumes that over the long run, a position in 5-year futures is equivalent to a combination of 2-, 10- and 30-year futures. However, the portfolio manager has a specific trading view of the 5-year sector, which incorporates the idiosyncratic behavior of this sector. In addition, the portfolio manager's time horizon may be shorter than the long-run horizon of the PCA or factor model. Further, the principal components may change over time. Therefore, the manager would like its view to be expressed in the 5-year sector (as opposed to some combination of the 2-, 10- and 30-year sectors).

Accordingly, there exists a need for a greater degree of precision in the representation of yield curve exposure, while retaining some of the parsimony of the principal-component or factor hedging framework.

SUMMARY

In one general aspect, embodiments of the present invention are directed to a computer-assisted method for analyzing the interest rate exposure of a fixed-income instrument, such as a bond. The method includes the step of identifying N significant constituent exposures in a yield curve. The significant constituent exposures may be, for example, exposures identified from principal component analysis or factor analysis. The method may also include the step of computing a unique set of hedge weights for M hedge instruments, wherein M>N, that nullifies the N significant constituent exposures of the fixed-income instrument and that minimizes up to M key-rate exposures of the fixed-income instrument. This method is capable of providing the benefit of the parsimony of the principal component or factor analysis models, yet canceling out as much of the key-rate exposures of the hedged instrument as possible. N preferably equals three and M preferably equals five.

According to various implementations, the hedge weights for each instrument in a portfolio of fixed-income instruments can be aggregated. In addition, the hedge weights for each instrument in a portfolio index applicable to the portfolio may be aggregated, and the aggregated portfolio hedge weights can be compared to the aggregated index hedge weights to obtain a measure of the interest rate exposure of the portfolio relative to the index.

In other embodiments, different processes may be used to compute the hedge weights for the fixed-income instruments depending upon whether they include embedded options or not. According to one embodiment, the hedge weights for instruments with embedded options may be computed as described above. The hedge weights for instruments without embedded options may be computed by selecting K hedge instruments from a larger set of L hedge instruments (L>K) that most closely brackets the instrument to be hedged and computing the hedge weights to cancel K significant constituent exposures (e.g., principal component exposures or factor exposures) using Equations 1-3 above. Thus, in such an embodiment, any given fixed-income instrument in the portfolio (or the index) without embedded options is only hedged by K hedge instruments, but the K hedge instruments selected from the group of L hedge instruments may vary from instrument to instrument. K preferably equals three and L preferably equals five. Also, the L hedge instruments in the set may be the same as or different from the M hedge instruments used to hedge the instruments with embedded options.

Various embodiments of the present invention are also directed to related computer readable media and computer systems.

DESCRIPTION OF THE FIGURES

Various embodiments of the present invention are described herein by way of example in conjunction with the following figures, wherein.

DESCRIPTION OF THE INVENTION

Various embodiments of the present invention are directed to systems and methods for determining the interest rate exposure of a fixed-income instrument and/or a portfolio of fixed-income instruments. The fixed-income instruments may be, for example, debt instruments (such as bonds or notes from a private or government entity), money market instruments or preferred stock.

Figure 1:
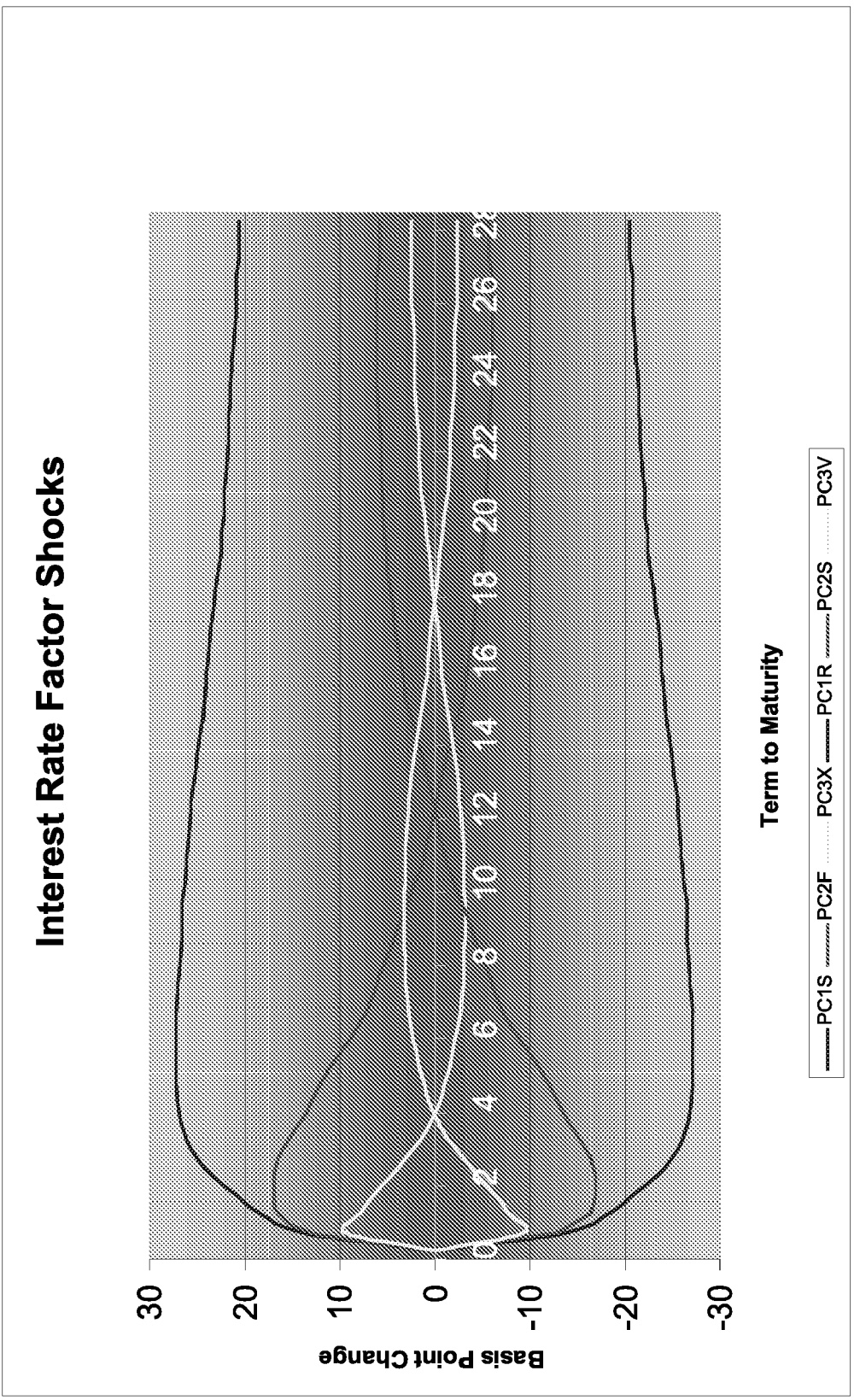
FIG. 1 is a diagram of a series of interest rate factor shocks for a yield curve.
Figure 2:
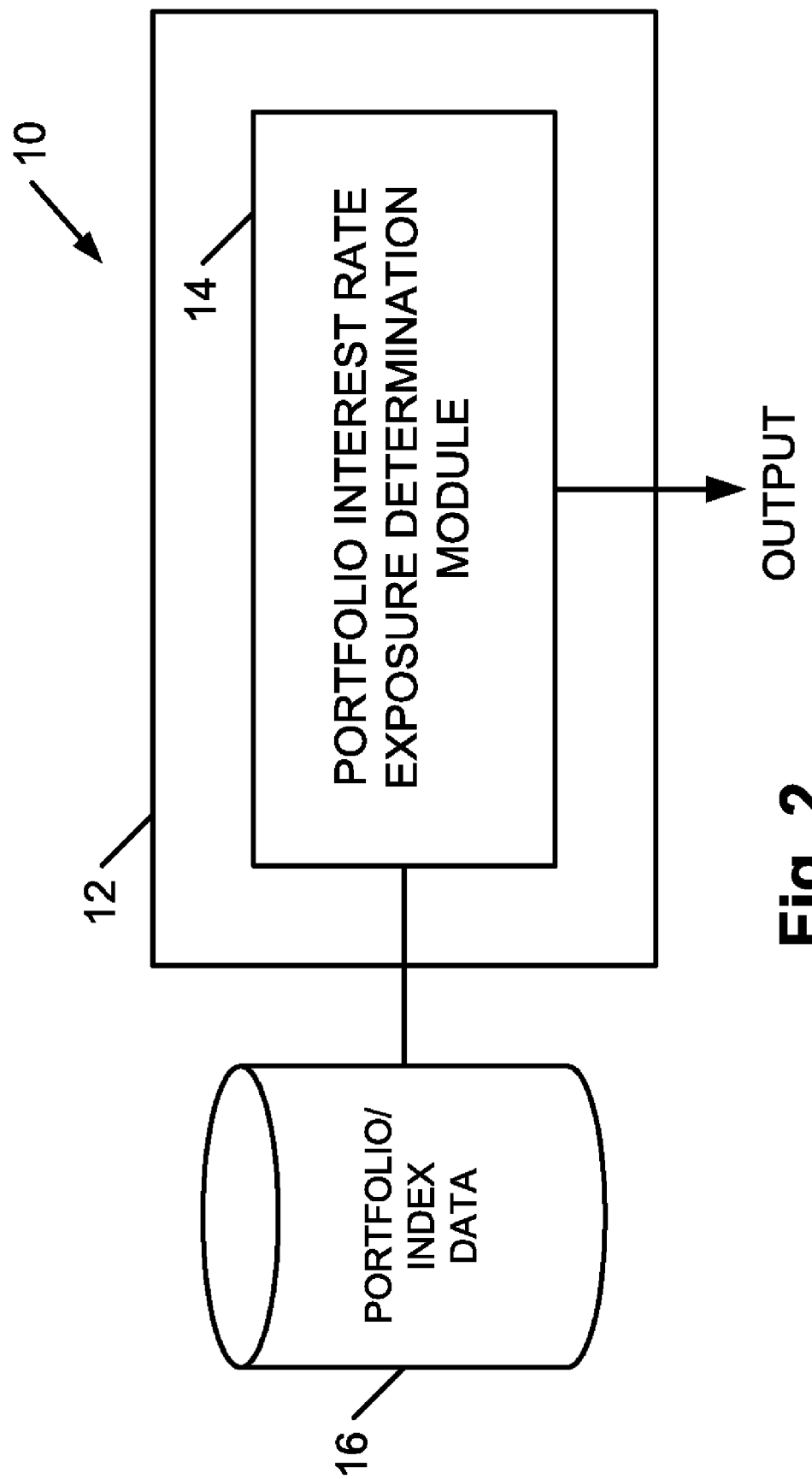
FIG. 2 is a diagram of a computer system according to various embodiments of the present invention.

FIG. 2 is a diagram of a computer system 10 that may be used to determine the interest rate exposure of the portfolio. The computer system 10 may include one or number of networked computing devices 12, such as PCs, servers, laptop computers, workstations, etc. The computer device 12 may include a portfolio interest rate exposure determination (PIRED) module 14. The PIRED module 14 may be implemented as software code to be executed by a processor of the computer device 12 using any suitable computer language, such as, for example, Java, C, C++, or Perl using, for example, conventional or object-oriented techniques. The software code may be stored as a series of instructions or commands on a computer-readable medium, such as a random access memory (RAM), a read-only memory (ROM), a magnetic medium such as a hard drive or a floppy disk, or an optical medium, such as a CD-ROM or DVD-ROM.

Figure 3:
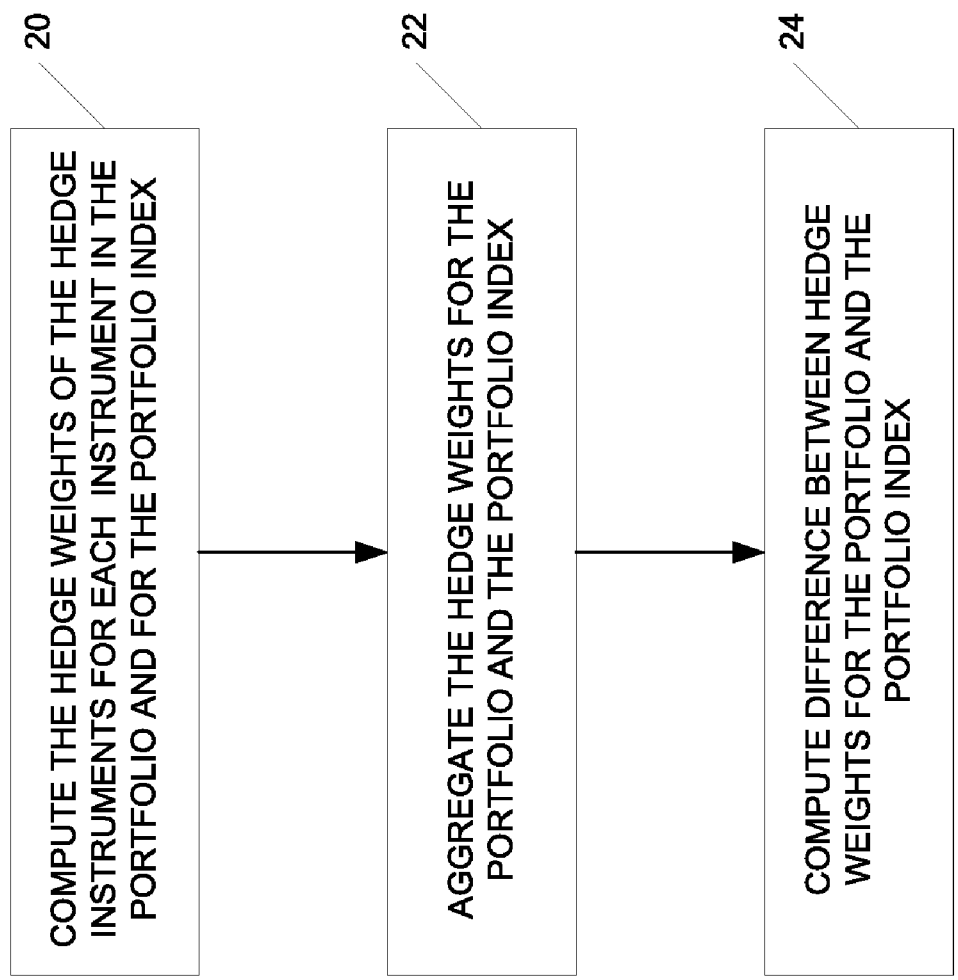
FIG. 3 is a diagram of the process flow through a portfolio interest rate exposure determination module of the computer system of FIG. 2 according to various embodiments of the present invention.

The PIRED module 14, according to various embodiments, computes the interest rate exposure of the portfolio of fixed-income instruments. FIG. 3 is a diagram of the process flow through the PIRED module 14 according to various embodiments. At step 20, the PIRED module 14 computes the hedge weights for the hedge instruments for each fixed-income instrument in the portfolio. The PIRED module 14 also computes the hedge weights for the relevant portfolio index. The relevant portfolio index is the portfolio index against which the performance of the portfolio is measured or compared. The portfolio index may be, for example, an index published by a third party, such as a brokerage house, and the manager of the portfolio may select the applicable index. Applicable indices may include, for example, one of the MSCI fixed income indices from Morgan Stanley Capital International Inc., the JP Morgan Government Bond Indices (GBI), the Merrill Lynch global bond indices, the Citigroup BIG index or any other appropriate fixed-income performance index.

The hedge instruments are preferably U.S. or Euro treasury futures, but could be other types of liquid contracts, such as swap contracts or other types of appropriate derivative contracts. Various techniques for computing the hedge weights for the hedge instruments are described below.

Next, at step 22, the PIRED module 14 aggregates the hedge weights of the hedging instruments for the portfolio and the portfolio index. Then, at step 24, the PIRED module compares the portfolio hedge weights and the index hedge weights. For example, the PIRED module 14 may determine the difference between the portfolio hedge weights and the index hedge weights. This value is indicative of the interest rate exposure of the portfolio. The output of the comparison operation may be, for example, displayed to a user of the system 10 on a display device (not shown), or stored in a file or a database. The portfolio manager may use this information in hedging its portfolio.

According to other embodiments, the hedge weights for the portfolio fixed-income instruments need not be compared to the hedge weights for the portfolio index. In this case, the PIRED module 14 would not need to calculate the hedge weight for the portfolio index, and the interest rate exposure of the portfolio may be gauged based on the values of the hedge weights for the portfolio in an absolute sense, without comparison to the hedge weights of a portfolio index.

Figure 4:
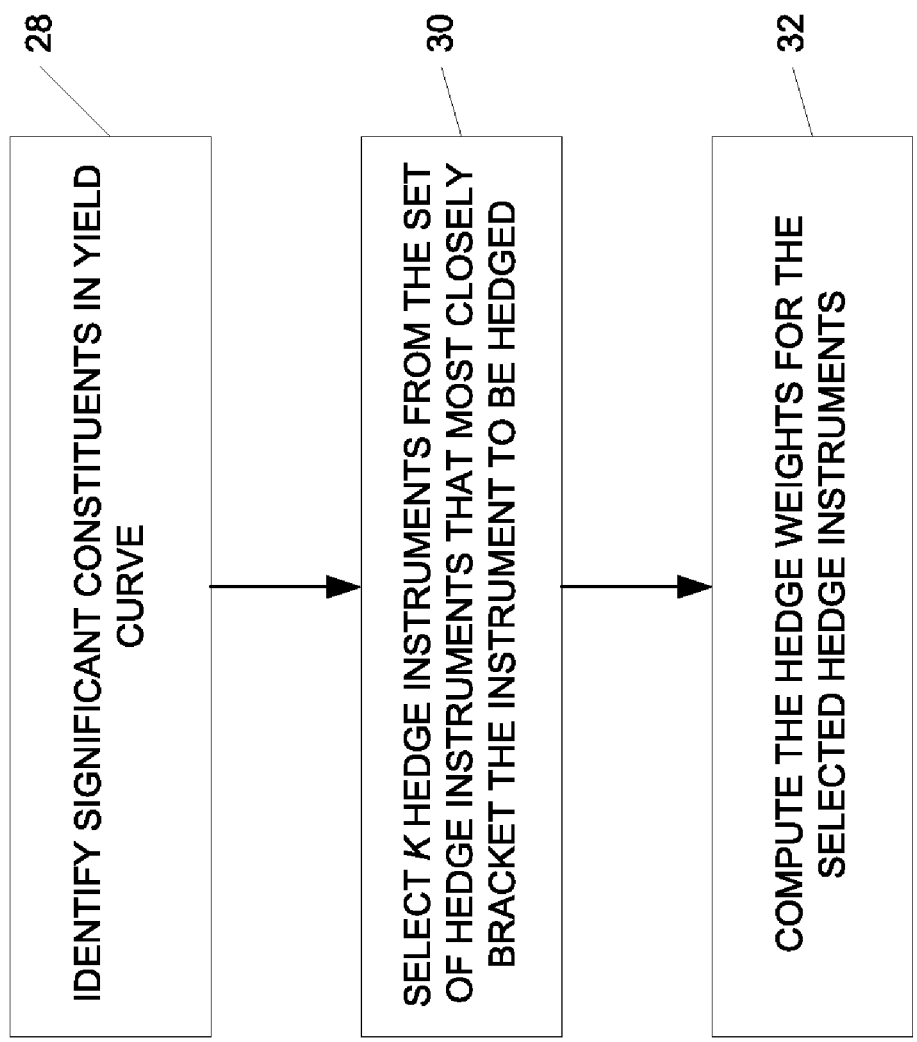
FIG. 4 is a diagram of a process flow for computing the hedge weights for hedge instruments for a fixed-income instrument according to various embodiments of the present invention.

According to various embodiments, the PIRED module 14 may compute the hedge weights of the hedge instruments for the fixed-income instruments in the portfolio differently depending on whether the fixed-income instruments have embedded options or not. FIG. 4 is a diagram of the process that the PIRED module 14 may use for determining the hedge weights for a fixed-income instrument without embedded options, such as non-callable corporate bonds, according to various embodiments of the present invention. The PIRED module 14 may perform the process of FIG. 4 for each instrument in the portfolio without embedded options, as well as for each instrument in the portfolio index without embedded options.

First, at step 28, the PIRED module 14 may identify the N principal component exposures or factor exposures in the yield curve. Conventional principal component or factor analysis can be used for this step. Principal component analysis and factor analysis are two different, known statistical methods used in interest rate exposure analysis field to identify significant components or "constituents" of the yield curve. The term "significant constituent" is used hereinafter to refer to either the principal components in PCA or the factors in factor analysis, or the relevant significant values in other applicable statistical analyses. Preferably, three significant constituents (e.g., principal components or factors) in the yield curve (corresponding to three significant constituent exposures) are identified (i.e., K=3).

Next, at step 30, the PIRED module 14 may select K hedge instruments from a larger set of hedge instruments to be used for hedging the instrument of the portfolio (or the index). For purposes of this explanation, it will be assumed that three hedge instruments (K=3) will be used to hedge any particular instrument in the portfolio (or the index). The larger set of L instruments of hedge instruments will include a number of hedge instruments greater than K (i.e., L>K). As explained further below, all of the instruments in the portfolio to be hedged without embedded options are preferably hedged with a subset of the hedge instruments in this set. Preferably, when three significant constituent exposures are used, the set includes five hedge instruments. This is because in practice, managing exposure at more than five points in the yield curve typically incurs too many trading costs as well as negates the parsimony of the PCA and factor models. The hedge instruments in the set of hedge instruments may have different maturities, such as 6 months, 2 years, 5 years, 10 years and 30 years. For example, the set of hedge instruments may include the 2-, 5-, 10- and 30-year US Treasury futures and a synthetic 6-months Euro future (e.g., two consecutive 3-mos Euro futures).

At step 30, the PIRED module 14 preferably selects the K instruments from the set that most closely bracket the duration of the fixed-income instrument to be hedged. This is because, as the inventor has discovered, empirically the impact of changes in factor estimation increases as the distance between sectors on the yield curve increases. Therefore, the closer the proximity of the hedge instruments to the instrument being hedged, the smaller the potential error due to changes in factor shape. Consequently, for example, if the set of hedge instrument includes the ones listed above (e.g., the 2-, 5-, 10- and 30-year U.S. treasury futures and a 6-mos Euro future), and the instrument to be hedged is a 15-year bond, the PIRED module 14 would select the 5-, 10- and 30-year hedge instruments because those instruments are the instruments from the set that most closely bracket the instrument to be hedged. On the other hand, if the instrument to be hedged is a 5-year bond, the PIRED module 14 would select the 2-, 5- and 10-year hedge instruments. Similarly, if the instrument to be hedged is a 2-year bond, the PIRED module would select the 6-mos, 2- and 5-year hedge instruments. Note, therefore, that any given fixed-income instrument in the portfolio (or the index) is only hedged by three hedge instruments (in this example), but that the three hedge instruments may vary from fixed-income instrument to fixed-income instrument.

Next, at step 32, the PIRED module 14 may compute the hedge weights for the selected hedge instruments using, for example, Equations 1-3 described above.

Bonds with embedded options exhibit more uncertainty with regard to the timing and magnitude of their cash flows. Furthermore, their cash flows tend to be widely dispersed. Therefore, according to various embodiments, the PIRED module 14 may compute the interest rate exposure for fixed-income instruments with embedded options differently than ones without embedded options. According to various embodiments, given the existence of N significant constituents (e.g., principal components or factors), the PIRED module 14 may compute the hedge weights for M hedge instruments, where M>N, for instruments with embedded options. This allows each instrument in the portfolio to be hedged by M hedge instruments. The solution employed by the PIRED module 14, explained further below, satisfies the requirements of the PCA or factor model and is unique. Therefore, the combination of factor exposures of the M hedges of a given instrument exactly nullifies the N significant constituent exposures of the instrument. Preferably, N=3 and M=5.

Also, portfolio managers may wish to incorporate the key-rate exposures of the portfolio instruments and the hedging instruments into the hedging framework. Key-rate exposures of a financial instrument are derived from key-rate shocks to the spot curve (i.e., the zero coupon curve). Each key-rate shock will give rise to a corresponding key-rate exposure. The sum of the key rate shocks results in a parallel (up and down) shift to the spot curve. Any shape may be used for the key-rate shocks, although triangular-shaped shocks centered around chosen points on the yield curve, as shown in FIG. 5, are most commonly used in the fixed-income interest rate exposure field.

In general, a weighted combination of hedge instruments that exactly nullifies the significant constituent exposures of a given instrument will not exactly nullify its key-rate exposures, since the two approaches have different underlying assumptions about the dynamics of the yield curve. The key-rate approach is less useful for hedging than the PCA and factor approaches since the covariance and correlation relationships between different points on the yield curve are not utilized. Thus, there is a tradeoff between hedging parsimony (PCA or factor approach) and trading-view precision (key-rate exposure approach). In other words, if the number of hedge instruments greatly exceeds the number of significant constituent exposures, the utility of the PCA approach is lost.

However, key-rate exposures can serve as useful adjuncts to principal component or factor exposures. Key-rates provide localized, non-systematic information about exposures to chosen sectors of the yield curve. Further, key-rate generation is not limited by stability constraints; in general, it is possible to generate a larger number of key-rate shocks than factor or principal components. According to various embodiments, the PIRED module 14 may use hedge instruments to exactly satisfy the requirements of the factor or PCA models, while retaining as much key-rate information as possible. Intuitively, given more hedge instruments than factors, the key-rates enable one to choose a unique set of hedge weights, such that the factor or PCA models requirements are exactly satisfied. In addition, this hedging combination also cancels out as much of the key-rate exposures of the hedged instrument as possible.

Figure 5:
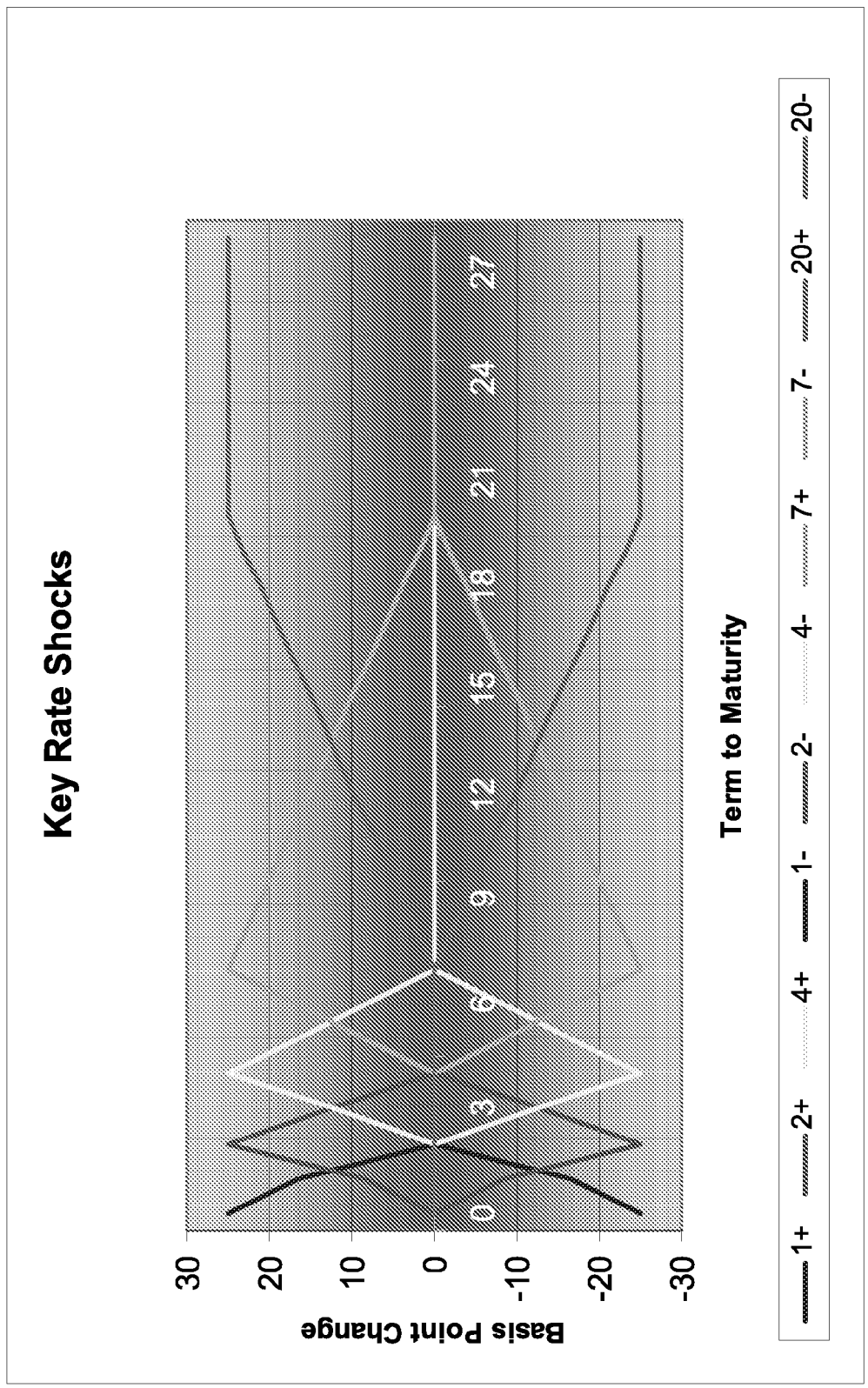
FIG. 5 is a diagram of a series of key-rate shocks for a yield curve.

For the example, assume N (number of significant constituent exposures)=3 and M (number of hedge instruments)=5, and that five key-rate shocks, centered on the 1-year, 2-year, 5-year, 10-year and 20-year points, are applied to the yield curve, as shown in FIG. 5. The set of five hedge instruments may include, for example, a 1-year (synthetic) future, and 2-, 5-, 10- and 30-year futures (such as US Treasury futures). For each hedge instrument $f_i$, $1 \leq i \leq 5$, the following data are available:

the 3 significant constituent exposures: $f_{i1}$, $f_{i2}$ and $f_{i3}$ the 5 key-rate exposures: $k_{i1}$, $k_{i2}$, $k_{i3}$, $k_{i4}$, and $k_{i5}$ Expressed in mathematical notation:

A=matrix of significant constituent exposures of hedge instruments x=matrix of hedge weights y=matrix of significant constituent exposures of instrument to be hedged B=matrix of key-rate exposures of hedge instruments z=matrix of key-rate exposures of instrument being hedged The problem is to perform a least squares operation on |Bx−z|, that is choose the weights of the matrix x that minimizes the sum of the squared deviation of Bx from z, subject to the constraint that Ax=y, which is the N-factor or PCA model constraint. The unique closed-form solution that may be employed by the PIRED module 14 to solving this problem is:

$$x=B^{-1}[M^T(MM^T)^{-1}p+z] \qquad \text{Eq. 4}$$

where $M=AB^{-1}$ and $p=y-Mz$, where elements of the matrix x are in numbers of units of notional for the hedge instruments and where elements of the matrices A, B, y, and z are in the currency of the hedge instrument.

The matrix x contains the weights for each hedge instrument. Thus, referring to the process shown in FIG. 3, the weights of all instruments in the portfolio (and the index) may then be aggregated (step 22), and the difference between the portfolio weights and the index weights may be computed (step 24), the resulting values being indicative of the interest rate exposure of the portfolio relative to the portfolio index. This difference is expressed in terms of M sectors of the curve, and it allows for greater precision in yield curve management.

Equation 4 provides a closed-form solution, which makes the process more practical than solutions that use numerical methods because of the computational difficulties and long run-times associated with numerical methods, especially when the process is performed daily for portfolios containing several thousand fixed income instruments.

In an embodiment, such as described above, where some instruments in the portfolio (e.g., instruments without embedded options) are analyzed according to one technique and other instruments in the portfolio (e.g., instruments with embedded options) are analyzed according to another technique, the hedging instruments for each technique may be completely different, have some overlap, or be identical. As mentioned above, however, managing exposure at more than five points in the yield curve typically incurs too many trading costs In the above-described embodiments, the PIRED module 14 used a technique for computing the hedge weights for instruments without embedded options (described in conjunction with FIG. 4) and another technique for computing the hedge weights for instruments with embedded options (described in conjunction with FIG. 5). It should be noted that according to other embodiments, the PIRED module 14 may use either technique for both types of instruments. That is, the PIRED module 14 may compute the hedge weights for all instruments (with or without embedded options) using the technique described above conjunction with FIG. 4, or may compute the hedge weights for all instruments using the technique described above in connection with FIG. 5.

Although the invention has been described in detail with particular reference to preferred embodiments thereof, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A computer-assisted method for analyzing the interest rate exposure of a fixed-income instrument comprising:

identifying N significant constituent exposures in a yield curve; and computing, using a computer, a unique set of hedge weights for M hedge instruments, wherein M>N, based on the formula:

$$x=B^{-1}[M^T(MM^T)^{-1}p+z]$$

where $M=AB^{-1}$ and $p=y-Mz$, and where:

A represents a matrix of significant constituent exposures of the hedge instruments, x represents a matrix of the computed hedge weights, wherein elements of the matrix x are numbers of units of notional for the hedge instruments, y represents a matrix of significant constituent exposures of the instrument to be hedged, B represent a matrix of key-rate exposures of the hedge instruments, and z represents a matrix of key-rate exposures of the instrument being hedged, where elements of matrices A, B, y, and z are in a currency of the hedge instruments.

2. The method of claim 1, wherein the N significant constituent exposures include N principal component exposures.

3. The method of claim 1, wherein the N significant constituent exposures include N factor exposures.

4. The method of claim 1, wherein N equals 3 and M equals 5.

5. A computer-assisted method of assessing the interest rate exposure of a portfolio of fixed-income instruments, comprising:

for each fixed-income instrument in the portfolio, identifying N significant constituent exposures in a yield curve, and computing, using a computer, a unique set of portfolio hedge weights for M hedge instruments, wherein M>N; and aggregating, using the computer, the portfolio hedge weights of the fixed-income instruments in the portfolio, wherein the unique set of hedge weights is computed based on the formula:

$$x=B^{-1}[M^T(MM^T)^{-1}p+z]$$

where $M=AB^{-1}$ and $p=y-Mz$, and where:

A represents a matrix of significant constituent exposures of the hedge instruments, x represents a matrix of the computed hedge weights, wherein elements of the matrix x are numbers of units of notional for the hedge instruments, y represents a matrix of significant constituent exposures of the instrument to be hedged, B represent a matrix of key-rate exposures of the hedge instruments, and z represents a matrix of key-rate exposures of the instrument being hedged, where elements of matrices A, B, y, and z are in a currency of the hedge instruments.

6. The method of claim 5, further comprising:

for each instrument in a portfolio index applicable to the portfolio, computing a unique set of index hedge weights for the M hedge instruments;

aggregating the index hedge weights of the fixed-income instruments in the portfolio index; and comparing the portfolio hedge weights to the index hedge weights.

7. The method of claim 6, wherein N equals 3 and M equals 5.

8. The method of claim 6, wherein the N significant constituent exposures include N principal component exposures.

9. The method of claim 6, wherein the N significant constituent exposures include N factor exposures.

10. A computer readable medium having instructions stored thereon, which, when executed by a processor, cause the processor to:
identify N significant constituent exposures in a yield curve; and
compute a unique set of hedge weights for M hedge instruments, wherein M>N based on the formula:

$$x=B^{-1}[M^T(MM^T)^{-1}p+z]$$

where $M=AB^{-1}$ and $p=y-Mz$, and where:
A represents a matrix of significant constituent exposures of the hedge instruments,
x represents a matrix of the computed hedge weights, wherein elements of the matrix x are numbers of units of notional for the hedge instruments,
y represents a matrix of significant constituent exposures of the instrument to be hedged,
B represent a matrix of key-rate exposures of the hedge instruments, and
z represents a matrix of key-rate exposures of the instrument being hedged, where elements of matrices A, B, y, and z are in a currency of the hedge instruments.

11. The computer readable medium of claim 10, wherein the N significant constituent exposures include N principal component exposures.

12. The computer readable medium of claim 10, wherein the N significant constituent exposures include N factor exposures.

13. The computer readable medium of claim 10, wherein N equals 3 and M equals 5.

14. A computer readable medium having instructions stored thereon, which, when executed by a processor, cause the processor to:
for each fixed-income instrument in the portfolio, identify N significant constituent exposures in a yield curve, and compute a unique set of portfolio hedge weights for M hedge instruments, wherein M>N; and
aggregate the portfolio hedge weights of the fixed-income instruments in the portfolio,
wherein the unique set of hedge weights is computed based on the formula:

$$x=B^{-1}[M^T(MM^T)^{-1}p+z]$$

where $M=AB^{-1}$ and $p=y-Mz$, and where:
A represents a matrix of significant constituent exposures of the hedge instruments,
x represents a matrix of the computed hedge weights, wherein elements of the matrix x are numbers of units of notional for the hedge instruments,
y represents a matrix of significant constituent exposures of the instrument to be hedged,
B represent a matrix of key-rate exposures of the hedge instruments, and
z represents a matrix of key-rate exposures of the instrument being hedged, where elements of matrices A, B, y, and z are in a currency of the hedge instruments.

15. The computer readable medium of claim 14, wherein the instructions, when executed, further cause the processor to:
for each instrument in a portfolio index applicable to the portfolio, compute a unique set of index hedge weights for the M hedge instruments;
aggregate the index hedge weights of the fixed-income instruments in the portfolio index; and
compare the portfolio hedge weights to the index hedge weights.

16. The computer readable medium of claim 15, wherein N equals 3 and M equals 5.

17. The computer readable medium of claim 15, wherein the N significant constituent exposures include N principal component exposures.

18. The computer readable medium of claim 15, wherein the N significant constituent exposures include N factor exposures.

19. A computer system for analyzing the interest rate exposure of a fixed-income instrument comprising:
a processor; and
a memory in communication with the processor, wherein the memory includes instructions, which when executed by the processor, cause the processor to:
identify N significant constituent exposures in a yield curve; and
compute a unique set of hedge weights for M hedge instruments, wherein M>N, based on the formula:

$$x=B^{-1}[M^T(MM^T)^{-1}p+z]$$

where $M=AB^{-1}$ and $p=y-Mz$, and where:
A represents a matrix of significant constituent exposures of the hedge instruments,
x represents a matrix of the computed hedge weights, wherein elements of the matrix x are numbers of units of notional for the hedge instruments,
y represents a matrix of significant constituent exposures of the instrument to be hedged,
B represent a matrix of key-rate exposures of the hedge instruments, and
z represents a matrix of key-rate exposures of the instrument being hedged, where elements of matrices A, B, y, and z are in a currency of the hedge instrument.

20. The computer system of claim 19, wherein the N significant constituent exposures include N principal component exposures.

21. The computer system of claim 19, wherein the N significant constituent exposures include N factor exposures.

22. The computer system of claim 19, wherein N equals 3 and M equals 5.

23. A computer system for analyzing the interest rate exposure of a fixed-income instrument comprising:
a processor; and
a memory in communication with the processor, wherein the memory includes instructions, which when executed by the processor, cause the processor to:
for each fixed-income instrument in the portfolio, identify N significant constituent exposures in a yield curve, and computing compute a unique set of portfolio hedge weights for M hedge instruments, wherein M>N; and
aggregate the portfolio hedge weights of the fixed-income instruments in the portfolio, wherein the unique set of hedge weights is computed based on the formula:

$$x=B^{-1}[M^T(MM^T)^{-1}p+z]$$

where $M=AB^{-1}$ and $p=y-Mz$, and where:
- A represents a matrix of significant constituent exposures of the hedge instruments,
- x represents a matrix of the computed hedge weights, wherein elements of the matrix x are numbers of units of notional for the hedge instruments,
- y represents a matrix of significant constituent exposures of the instrument to be hedged,
- B represent a matrix of key-rate exposures of the hedge instruments, and
- z represents a matrix of key-rate exposures of the instrument being hedged, where elements of matrices A, B, y, and z are in a currency of the hedge instrument.

24. The computer system of claim 23, wherein the memory additionally stores instructions which cause the processor to:
- for each instrument in a portfolio index applicable to the portfolio, compute a unique set of index hedge weights for the M hedge instruments;
- aggregate the index hedge weights of the fixed-income instruments in the portfolio index; and
- compare the portfolio hedge weights to the index hedge weights.

25. The computer system of claim 24, wherein N equals 3 and M equals 5.

26. The computer system of claim 24, wherein the N significant constituent exposures include N principal component exposures.

27. The computer system of claim 24, wherein the N significant constituent exposures include N factor exposures.

28. The method of claim 6, further comprising outputting results of the comparison of the portfolio hedge weights to the index hedge weights to a computer database.

29. The method of claim 6, further comprising outputting results of the comparison of the portfolio hedge weights to the index hedge weights to a computer display device.

30. The computer system of claim 24, further comprising a computer database for storing results of the comparison of the portfolio hedge weights to the index hedge weights to a computer database.

31. The computer system of claim 24, further comprising a display device for displaying results of the comparison of the portfolio hedge weights to the index hedge weights to a computer database.

* * * * *